(12) United States Patent
Cahill et al.

(10) Patent No.: US 8,392,845 B2
(45) Date of Patent: Mar. 5, 2013

(54) METHODS AND APPARATUS TO CONTROL INFORMATION PRESENTED TO PROCESS PLANT OPERATORS

(75) Inventors: James Stephen Cahill, Austin, TX (US); Christopher John Felts, Austin, TX (US); Cindy Alsup Scott, Georgetown, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1168 days.

(21) Appl. No.: 11/849,796

(22) Filed: Sep. 4, 2007

(65) Prior Publication Data

US 2009/0064019 A1 Mar. 5, 2009

(51) Int. Cl.
*G06F 3/048* (2006.01)
(52) U.S. Cl. .......................................... 715/771; 715/764
(58) Field of Classification Search .................. 715/771, 715/764–765, 965; 700/17, 19, 52, 73–74
See application file for complete search history.

(56) References Cited

U.S. PATENT DOCUMENTS

| | | | |
|---|---|---|---|
| 4,500,687 A | 2/1985 | Wolfe | |
| 4,570,217 A | 2/1986 | Allen et al. | |
| 5,353,400 A | 10/1994 | Nigawara et al. | |
| 5,355,320 A | 10/1994 | Erjavic et al. | |
| 5,400,246 A * | 3/1995 | Wilson et al. | 700/17 |
| 5,576,946 A | 11/1996 | Bender et al. | |
| 5,581,242 A | 12/1996 | Arita et al. | |
| 5,631,825 A | 5/1997 | Van Weele et al. | |
| 5,644,686 A | 7/1997 | Hekmatpour | |
| 5,689,415 A | 11/1997 | Calotychos et al. | |
| 5,696,885 A | 12/1997 | Hekmatpour | |
| 5,720,007 A | 2/1998 | Hekmatpour | |
| 5,768,119 A | 6/1998 | Havekost et al. | |
| 5,806,056 A | 9/1998 | Hekmatpour | |
| 5,822,745 A | 10/1998 | Hekmatpour | |
| 5,870,768 A | 2/1999 | Hekmatpour | |
| 5,990,906 A | 11/1999 | Hudson et al. | |
| 6,296,711 B1 | 10/2001 | Loan et al. | |

(Continued)

FOREIGN PATENT DOCUMENTS

| | | |
|---|---|---|
| EP | 0389132 | 9/1990 |
| GB | 234158 | 5/1925 |

(Continued)

OTHER PUBLICATIONS

Extended European Search Report corresponding to Application No. 08163572.4, dated Apr. 24, 2009, 11 pages.

(Continued)

*Primary Examiner* — Weilun Lo
*Assistant Examiner* — Truc Chuong
(74) *Attorney, Agent, or Firm* — Hanley, Flight & Zimmerman, LLC (57) ABSTRACT

Methods and apparatus to upgrade and control information presented to process plant operators are disclosed. A disclosed example method to control information presented to a process plant operator comprises presenting a first version of a process plant display, presenting a dynamic attention user interface when a selectable element of the first version of the process plant operator display is activated, wherein the dynamic attention user interface is to be used to adjust an importance of information presented in the first version of the process plant display, and presenting a second version of the process plant display based on a variable adjusted via the dynamic attention user interface.

22 Claims, 6 Drawing Sheets

U.S. PATENT DOCUMENTS

| | | | |
|---|---|---|---|
| 6,385,552 | B1 | 5/2002 | Snyder |
| 6,415,246 | B1 | 7/2002 | Snyder |
| 6,507,765 | B1 | 1/2003 | Hopkins et al. |
| 6,542,841 | B1 | 4/2003 | Snyder |
| 6,615,091 | B1 | 9/2003 | Birchenough et al. |
| 6,647,301 | B1 | 11/2003 | Sederlund et al. |
| 6,791,692 | B2 | 9/2004 | Powell et al. |
| 6,915,235 | B2 * | 7/2005 | Reeves et al. ............ 702/182 |
| 6,952,688 | B1 | 10/2005 | Goldman et al. |
| 6,952,808 | B1 | 10/2005 | Jamieson et al. |
| 6,976,033 | B2 | 12/2005 | Yang et al. |
| 7,019,829 | B2 | 3/2006 | Powell et al. |
| 7,092,771 | B2 | 8/2006 | Retlich et al. |
| 7,171,281 | B2 | 1/2007 | Weber et al. |
| 7,202,946 | B2 | 4/2007 | Powell et al. |
| 2002/0055790 | A1 | 5/2002 | Havekost |
| 2002/0149602 | A1 | 10/2002 | Redpath et al. |
| 2003/0028268 | A1 * | 2/2003 | Eryurek et al. ............ 700/73 |
| 2005/0052659 | A1 | 3/2005 | Jacobsen et al. |
| 2006/0061486 | A1 * | 3/2006 | Luskin ............ 340/907 |

FOREIGN PATENT DOCUMENTS

| | | |
|---|---|---|
| GB | 2275564 | 8/1994 |
| GB | 2272325 | 11/1994 |
| JP | 10187232 | 7/1998 |
| JP | 2000-099112 | 4/2000 |
| JP | 02-281105 | 9/2002 |
| JP | 2004-080401 | 3/2004 |
| JP | 08-006883 | 1/2008 |
| WO | 2006103541 | 10/2006 |

OTHER PUBLICATIONS

Anonymous, "DeltaV Operate," Delta V Product Data Sheet, Mar. 2006 [retrieved from http://web.archive.org/web/20061020040751/http://www.easydeltav.com/pd/PDS_deltav_operate.pdf, accessed on Mar. 19, 2009], pp. 1-9.

Anonymous, "Operator Station Software Suite," Delta V Product Data Sheet, Dec. 2006 [retrieved from http://www.easydeltav.com/pd/PDS_OperatorStation.pdf, accessed on Mar. 18, 2009], pp. 1-7.

Steve Rubel, "Paying Attention to Attention," Mar. 28, 2006, [retrieved from http://www.micropersuasion.com/2006/03/paying_attentio.html, accessed on Feb. 11, 2009], 2 pages.

"The Touchstone Manifesto," Touchstone—Are you Paying Attention, Jun. 13, 2006 [retrieved from http://web.archive.org/web/20060615001506/www.touchstonegadget.com/manifesto/, accessed on Feb. 11, 2009], 2 pages.

UK Search Report corresponding to Application No. GB0816070.7, dated Nov. 26, 2008, 4 pages.

European Patent Office, Communication pursuant to Article 94(3) EPC issued in connection with European Application No. 08163572.4, dated Dec. 13, 2010, 6 pages.

Intellectual Property Office, Examination Report, issued for Great Britain Application No. GB0816070.7, on Aug. 30, 2011, (3 pages).

State Intellectual Property Office of P.R. China, First Office Action, for corresponding Chinese patent application serial No. 200810146684.0, issued on Apr. 6, 2012, 6 pages.

Japanese Patent Office, Notice of Reasons for Rejection issued in connection with Japanese Application No. 2008-221110, Nov. 20, 2012, 6 pages.

* cited by examiner

METHODS AND APPARATUS TO CONTROL INFORMATION PRESENTED TO PROCESS PLANT OPERATORS

FIELD OF THE DISCLOSURE

This disclosure relates generally to process plants and, more particularly, to methods and apparatus to control information presented to process plant operators.

BACKGROUND

Distributed process control systems, like those used in chemical, petroleum and/or other processes, systems, and/or process plants typically include one or more process controllers communicatively coupled to one or more field devices via any of a variety of analog, digital and/or combined analog/digital buses. In such systems and/or processes, field devices including, for example, valves, valve positioners, switches and/or transmitters (e.g., temperature, pressure, level and flow rate sensors), are located within the process environment and perform process control, alarm and/or management functions such as opening or closing valves, measuring process parameters, etc. Process controllers, which may also be located within the plant environment, receive signals indicative of process measurements made by the field devices and/or other information pertaining to the field devices. Based on, for example, the received signals, the process controllers execute a controller application to realize any number and/or type(s) of control modules, software modules, software sub-systems, routines and/or software threads to initiate alarms, make process control decisions, generate control signals, and/or coordinate with other control modules and/or function blocks performed by field devices, such as HART and Foundation Fieldbus devices. The control modules in the controller(s) send the control signals over the communication lines to the field devices to control the operation of the process plant.

Information from the field devices and/or the controller is usually made available over a data highway or communication network to one or more other hardware devices, such as operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to the process(es) of a process plant, such as changing an operating state, changing settings of the process control routine(s), modifying the operation of the control modules within the process controllers and/or the field devices, viewing the current state of the process(es), viewing alarms generated by field devices and/or process controllers, simulating the operation of the process(es) for the purpose of training personnel and/or testing the process control software, keeping and/or updating a configuration database, etc.

As an example, the DeltaV™ digital automation system sold by Fisher-Rosemount Systems, Inc., an Emerson Process Management company, supports multiple applications stored within and/or executed by different devices located at potentially diverse locations within a process plant. A configuration application, which resides in and/or is executed by one or more operator workstations, enables users to create and/or change process control applications, and/or download process control applications via a data highway or communication network to dedicated distributed controllers. Typically, these control applications are made up of communicatively coupled and/or interconnected control modules, software modules, software sub-systems, routines, software threads and/or function blocks that perform functions within the control scheme (e.g., process control and/or alarm generation) based on received inputs and/or that provide outputs to other blocks within the control scheme. Each dedicated controller and, in some cases, field devices, stores and/or executes a control application that runs the control modules assigned to implement actual process control functionality.

The configuration application also allows a configuration engineer to create one or more displays (e.g., a viewing application), for use by operators, maintenance personnel, etc. of the process plant, by selecting and/or building display objects using, for example, a display creation application. An example viewing application displays data for a process plant operator and/or enables the operator to change settings, such as set points and/or operating states, with the process control routines. These displays are typically implemented on a system-wide basis via one or more of the workstations, and present preconfigured displays to the operator and/or maintenance persons regarding the operating state(s) of the control system(s) and/or the devices within the plant. Example displays take the form of alarming displays that receive and/or display alarms generated by controllers or devices within the process plant, control displays that indicate the operating state(s) of the controller(s) and other device(s) within the process plant, maintenance displays that indicate the functional state of the device(s) and/or equipment within the process plant, etc.

SUMMARY

Methods and apparatus to control information presented to process plant operators are disclosed. A disclosed example method to control information presented to a process plant operator includes presenting a first version of a process plant display, presenting a dynamic attention user interface when a selectable element of the first version of the process plant operator display is activated, wherein the dynamic attention user interface is to be used to adjust an importance of information presented in the first version of the process plant display, and presenting a second version of the process plant display based on a variable adjusted via the dynamic attention user interface.

A disclosed example operator station apparatus includes a display, an operator display module to present an operator application on the display, a dynamic attention user interface to be presented on the display to obtain content filtering rules from an operator, and a content filter module to adjust data presented by the operator application based on the importance of information parameters.

DETAILED DESCRIPTION

Today, process manufacturing professionals including plant, project, operating, and maintenance personnel are increasingly overwhelmed by the amount of information to sift through to intelligently make decisions. For example, in a process control system it is common for thousands of alarms to be defined within the process control system to notify operators of the process plant of potential problems. Moreover, there may be thousands or process control variables that may be set, controlled, viewed and/or monitored by process plant personnel.

In general, the examples, apparatus, methods, and articles of manufacture described herein may be used to allow a process plant operator to easily and/or dynamically adjust the prioritization of information competing for their attention. Today, many process plant operator displays are pre-configured and do not allow a process plant operator to tailor the display of information based upon personal experience, personal preferences, and/or current conditions resulting in an overload of information presented to process plant operators and/or potentially causing the operators to miss critical process plant conditions. While, a process configuration engineer could conceivably design different process plant display applications for different process plant states and/or conditions, and/or for individual and/or groups of operators, the implementation of such large numbers of display applications is expensive, difficult to maintain and/or otherwise burdensome and is not as flexible as the example apparatus, methods and articles of manufactured described herein.

In particular, the examples described herein comprise a dynamic attention user interface that allows each process plant operator (and/or a group of operators) to prioritize, order, flag and/or identify what information, states, status, history, alarm priorities, alarm types, alarms and/or data are important (i.e., so called "pay attention" items), less important and/or not important. The dynamic attention user interface allows an operator to prioritize process control system data and/or information (which is typically available in one or more repositories of information within a process control solution) such as, for example, configuration data, real-time data, process plant state, process plant variables, process plant set-points, alarms, continuous history, batch history, event history, alarm summary displays, data analysis software, alarm analysis software, operator logs, and/or user actions. Moreover, items to be prioritized may be based on calculations, formulas, and/or other indirect methods.

An example dynamic attention user interface comprises an intuitive user interface that employs slider bars via which the importance of process control data and/or information can be prioritized and/or made persistent. In some examples, entered priorities can be collected over time, and then used to suggest other items to be prioritized based on each operator's current and/or historical set of prioritized items. The items that appear in an operator's prioritized items list need not be pre-configured and/or fixed. An operator's prioritized list may be manually selectable and/or controllable by each operator, by another operator, and/or may be automatically adjusted, configured and/or populated. For example, an operator may choose to more closely watch a particular piece of equipment (e.g., if it has been acting up recently), the operator may manually add and/or remove items from the list, the operator may be presented with a pre-configured list of items, and/or items may be automatically and/or dynamically added and/or removed from the list based on the dynamics of the process plant.

One or more filtering rules specified and/or provided by a process plant operator via the dynamic attention user interface may then be used to adjust what and/or how information is presented by and/or within an operator display application. The applied filtering rules can also be recorded in a data store, such as an electronic operator log, a system event log, a dynamic attention database, and/or a dynamic attention log.

Figure 1:
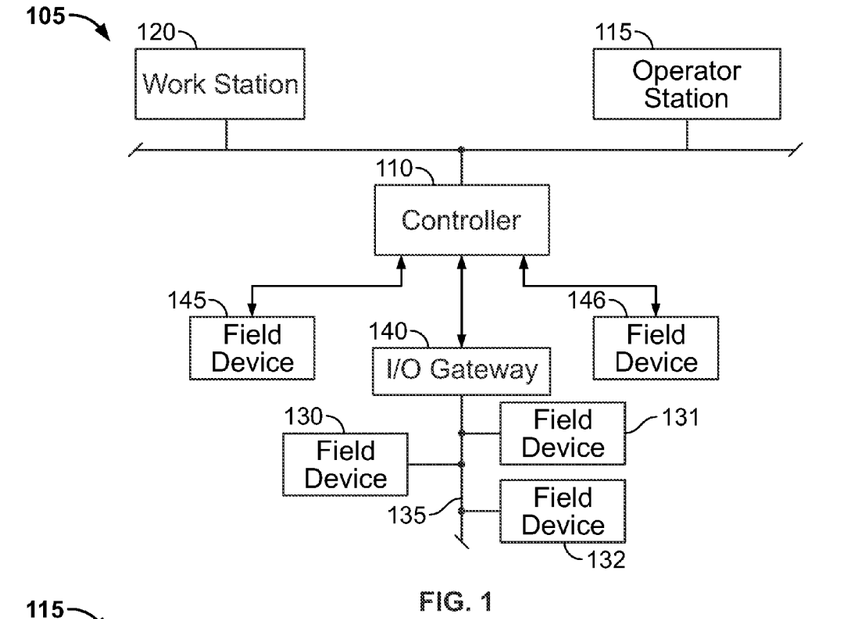
FIG. 1 is a schematic illustration of an example process control system constructed in accordance with the teachings of the invention.

FIG. 1 is a schematic illustration of an example process control system 105. The example process control system 105 of FIG. 1 includes one or more process controllers (one of which is designated at reference numeral 110), one or more operator stations (one of which is designated at reference numeral 115), and one or more workstations (one of which are designated at reference numeral 120). The example process controller 110, the example operator station 115 and the workstation 120 are communicatively coupled via a bus and/or local area network (LAN) 125, which is commonly referred to as an application control network (ACN).

The example operator station 115 of FIG. 1 allows a process plant operator to review and/or operate one or more operator display screens and/or applications that allow the process plant operator to view process plant variables, view process plant states, view process plant conditions, view process plant alarms, and/or to change process plant settings (e.g., set points and/or operating states, clear alarms, silence alarms, etc.). Such screens and/or applications are typically designed and/or implemented by process configuration engineers. An example manner of implementing the example operator station 115 of FIG. 1 is described below in connection with FIG. 2. Example operator display applications that may be used to implement the example operator station 115 are described below in connection with FIGS. 3, 4 and 5.

The example operator station 115 of FIG. 1 includes and/or implements a dynamic attention user interface (e.g., the example dynamic attention user interface of FIG. 4) to allow process plant operators to prioritize, order, flag and/or identify what information, alarms and/or data are more important, less important and/or not important for a particular operator display. The dynamic attention user interface allows an operator to prioritize process automation system data and/or information (which is typically available in one or more repositories of information within an process control solution) such as, for example, configuration, real-time data, process plant state, process plant variables, process plant variable changes, process plant state changes, status, historical period (e.g., 15 minutes, 1 hour, 4 hours, etc.), alarm types (e.g., device, process, hardware, etc.), alarm priorities, new variables, changed variables, process plant set-points, alarms, continuous history, batch history, event history, alarm summary displays, data analysis software, alarm analysis software, operator logs, process deviations, new alarms, trends and/or user actions. Moreover, items to be prioritized may based on calculations, formulas, and/or other indirect methods.

When one or more filtering rules are specified and/or provided by a process plant operator via the dynamic attention user interface, the example operator station 115 of FIG. 1 adjusts what and/or how data and/or information is presented by and/or within a particular operator display application. In some examples, the operator station 115 stores applied filtering rules in a data store, such as an electronic operator log, a system event log, a dynamic attention database, and/or a dynamic attention log. Additionally or alternatively, the example operator station 115 may collect priorities entered by operators, and then use the collected information to suggest other items to be prioritized based on each operator's current and/or historical set of pay attention items. The items that appear in an operator's list of prioritized items may be dynamic and, thus, selectable and/or controllable by each operator, and/or may be automatically added and/or removed from the list based on the dynamics of the process plant. Additionally or alternatively, the items that appear in an operator's list of prioritized items need not be pre-configured and/or fixed. An operator's prioritized list may be manually selectable and/or controllable by each operator, by another operator, and/or may be automatically adjusted, configured and/or populated.

The example workstation 120 of FIG. 1 may be configured as an application station to perform one or more information technology applications, user-interactive applications and/or communication applications. For example, the application station 120 may be configured to perform primarily process control-related applications, while another application station (not shown) may be configured to perform primarily communication applications that enable the process control system 105 to communicate with other devices or systems using any desired communication media (e.g., wireless, hardwired, etc.) and protocols (e.g., HTTP, SOAP, etc.). The example operator station 115 and the example workstation 120 of FIG. 1 may be implemented using one or more workstations and/or any other suitable computer systems and/or processing systems. For example, the operator station 115 and/or workstation 120 could be implemented using single processor personal computers, single or multi-processor workstations, etc.

The example LAN 125 of FIG. 1 may be implemented using any desired communication medium and protocol. For example, the example LAN 125 may be based on a hardwired and/or wireless Ethernet communication scheme. However, as will be readily appreciated by those having ordinary skill in the art, any other suitable communication medium(s) and/or protocol(s) could be used. Further, although a single LAN 125 is illustrated in FIG. 1, more than one LAN and/or other alternative pieces of communication hardware may be used to provide redundant communication paths between the example systems of FIG. 1.

The example controller 110 of FIG. 1 is coupled to a plurality of smart field devices 130, 131 and 132 via a digital data bus 135 and an input/output (I/O) gateway 140. The smart field devices 130-132 may be Fieldbus compliant valves, actuators, sensors, etc., in which case the smart field devices 130-132 communicate via the digital data bus 135 using the well-known Foundation Fieldbus protocol. Of course, other types of smart field devices and communication protocols could be used instead. For example, the smart field devices 130-132 could instead be Profibus and/or HART compliant devices that communicate via the data bus 135 using the well-known Profibus and HART communication protocols. Additional I/O devices (similar and/or identical to the I/O gateway 140 may be coupled to the controller 110 to enable additional groups of smart field devices, which may be Foundation Fieldbus devices, HART devices, etc., to communicate with the controller 110. Such smart field devices may provide much more data and/or information than non-smart field devices and, thus, may contribute to the information overload problem(s) addressed by the methods and apparatus described herein.

In addition to the example smart field devices 130-132, one or more non-smart field devices 145 and 146 may be communicatively coupled to the example controller 110. The example non-smart field devices 145 and 146 of FIG. 1 may be, for example, conventional 4-20 milliamp (mA) or 0-10 volts direct current (VDC) devices that communicate with the controller 110 via respective hardwired links.

The example controller 110 of FIG. 1 may be, for example, a DeltaV™ controller sold by Fisher-Rosemount Systems, Inc., an Emerson Process Management company. However, any other controller could be used instead. Further, while only one controller 110 in shown in FIG. 1, additional controllers and/or process control platforms of any desired type and/or combination of types could be coupled to the LAN 125. In any case, the example controller 110 performs one or more process control routines associated with the process control system 105 that have been generated by a system engineer and/or other system operator using the operator station 115 and which have been downloaded to and/or instantiated in the controller 110.

While FIG. 1 illustrates an example process control system 105 within which the methods and apparatus to control information presented to process plant operators described in greater detail below may be advantageously employed, persons of ordinary skill in the art will readily appreciate that the methods and apparatus to control information presented to process plant operators described herein may, if desired, be advantageously employed in other process plants and/or process control systems of greater or less complexity (e.g., having more than one controller, across more than one geographic location, etc.) than the illustrated example of FIG. 1.

Figure 2:
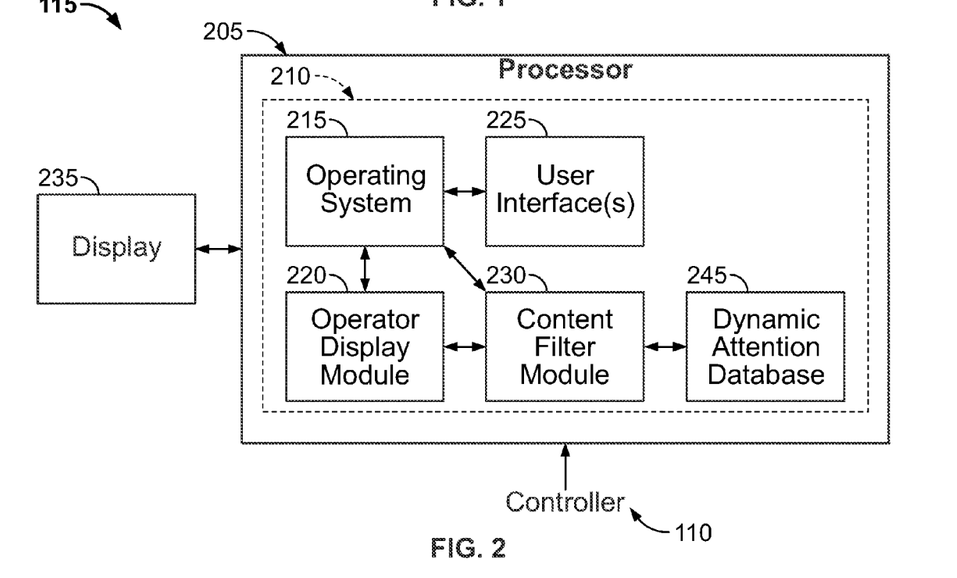
FIG. 2 illustrates an example manner of implementing the example operator station of FIG. 1.

FIG. 2 illustrates an example manner of implementing the example operator station 115 of FIG. 1. The example operator station 115 of FIG. 2 includes at least one programmable processor 205. The example processor 205 of FIG. 2 executes coded instructions present in a main memory 210 of the processor 205 (e.g., within a random-access memory (RAM) and/or a read-only memory (ROM)). The processor 205 may be any type of processing unit, such as a processor core, a processor and/or a microcontroller. The processor 205 may execute, among other things, an operating system 215, an operator display module 220, user interfaces 225, a content filter module 230, and a dynamic attention database 245. An example operating system 215 is an operating system from Microsoft®. The example main memory 210 of FIG. 2 may be implemented by and/or within the processor 205 and/or may be one or more memories and/or memory devices operatively coupled to the processor 205.

To allow an operator to interact with the example processor 205, the example operator station 115 of FIG. 2 includes any type of display 235. Example displays 235 include, but are not limited to, a computer monitor, a computer screen, a television, a mobile device (e.g., a smart phone, a Blackberry™ and/or an iPhone™), etc. capable to display user interfaces and/or applications implemented by the processor 205 and/or, more generally, the example operator station 115.

The example operating system 215 of FIG. 2 displays and/or facilitates the display of application user interfaces (e.g., any of the example user interfaces 225) by and/or at the example display 235. To facilitate operator interactions with applications implemented by the example operator station 115, the example operating system 215 implements an application programming interface (API) by which the example operator display module 220 and/or the example content filter module 230 can define and/or select a user interface 225, and cause and/or instruct the operating system 215 to display the defined and/or selected user interface 225. Example user interfaces 225 are described below in connection with FIGS. 3-5.

To present process plant operator displays and/or applications, the example operator station 115 of FIG. 2 includes the example operator display module 220. The example operator display module 220 of FIG. 2 collects data and/or information from one or more process controllers (e.g., the example controller 110 of FIG. 1) and/or other elements of a process plant control system, and uses the collected data and/or information to create and/or define a particular user interface 225 (e.g., either of the example interfaces of FIGS. 3 and/or 5) based on the state of the process plant and/or a portion of the process plant selected by an operator. The created and/or defined display is displayed at the example display 235 by and/or via the example operating system 215. The example operator display module 220 also receives operator inputs via the user interface 225 (e.g., in response to the operator selecting, adjusting and/or operating user interface elements of the user interface 225) and sends appropriate commands, data and/or information to the controller 110 and/or, more generally, the process control system 105.

Figure 4:
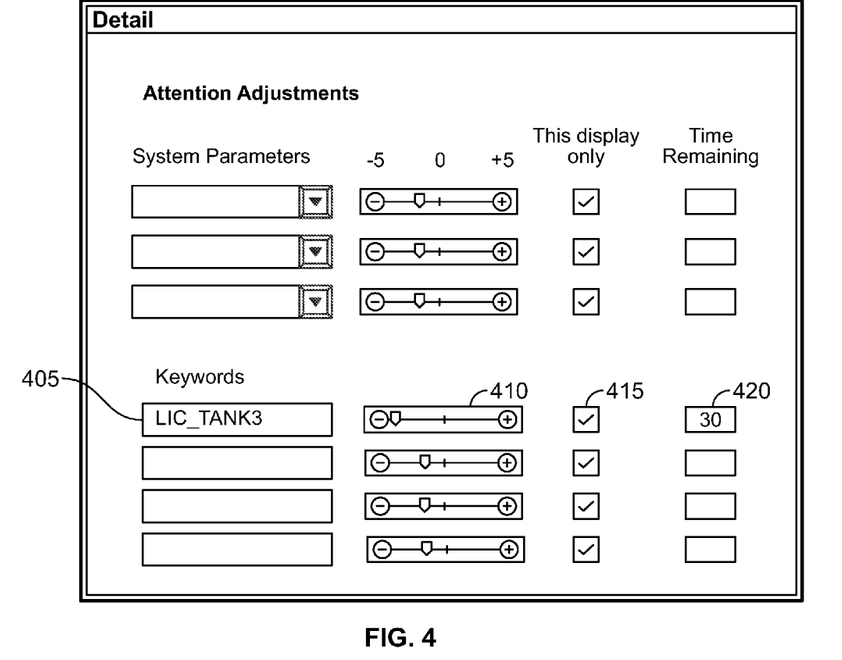

When a user of a display provided by the operator display module 220 indicates they desire to prioritize the display of operator data and/or information (e.g., by selecting an element and/or graphic of the operator display), the example operator display module 220 presents a dynamic attention user interface (e.g., the example interface of FIG. 4). The dynamic attention user interface may be displayed in addition to, or instead of, a previously displayed operator application.

To prioritize data and/or information presented by the operator display module 220, the example operator station 115 of FIG. 2 includes the example content filter module 230. Based on operator inputs provided via a dynamic attention user interface (e.g., the example interface of FIG. 4), the example content filter module 230 of FIG. 2 generates content filter rules that represent the relative priorities of data and/or information to be displayed. For example, if data associated with a particular process module is selected via the dynamic attention user interface as data to be ignored, the content filter module 230 blocks and/or prevents the operator display module 220 from receiving process control data and/or information associated with that process module. Additionally or alternatively, the content filter module 230 can instruct (e.g., via an API provided by the example operator display module 220), how and/or whether to display user interface elements of an operator application currently being executed by the operator display module 220. For example, the operator display module 220 can be instructed to highlight a particular user interface element and/or graphic, diminish in appearance (e.g., gray out) a particular user interface element and/or graphic, and/or not display and/or omit a particular user interface element and/or graphic. When and/or as instructed by the example content filter module 230, the example operator display module 220 updates applicable operator displays and/or operator applications currently being displayed at the example display 235. Such an updated application and/or display may include a user interface element and/or graphic signifying that content filtering is currently active. In some examples, prioritization selections made by one operator may be applied to displays and/or applications presented to other operators. Further, prioritization selections may be stored in, for example, an electronic operator log, a system event log, a dynamic attention database (e.g., the example database 245 described below) and/or a dynamic attention log.

In some examples, if an operator attempts to disable the display of information, data and/or alarms associated with, for example, a potentially life threatening safety condition or an equipment damaging condition, and/or any configured/programmed limit in the process plant (e.g., a HIHI alarm and/or a LOLO alarm), the example operator display module 220 and/or the example content filter module 230 may override the operator's inputs to ensure the continuing safe operation of the process plant.

To store data and/or information used by the example content filter module 230, the example operator station 210 of FIG. 2 includes a dynamic attention database 245. Using any type(s) and/or numbers of database records, fields and/or entries, the example dynamic attention database 245 of FIG. 2 stores data and/or information used by the content filter module 230 to, for one or more operators, control content filter, record applied content filters and/or to dynamically and/or automatically suggest pay attention items. Example data and/or information that may be stored in the example dynamic attention database 245 includes, but is not limited to, user profiles (e.g., names, roles, preferences, areas of responsibility, etc.), rules to assist in the automatic and/or dynamic creation of pay attention items, historical and/or current statistical data regarding pay attention items and/or settings to facilitate the prediction of which pay attention information are be presented, lists of each user's manually added data, lists of manually added data for each operator station. The example dynamic attention database 245 may be stored using any type(s) and/or numbers of memory(-ies) and/or memory device(s).

The example content filter module 230 of FIG. 2 can, additionally or alternatively, collect and/or record current and/or past content filter rule inputs (e.g., data and/or information received via a dynamic attention user interface), and then use the collected inputs to provide suggested item prioritizations. For example, when an operator initiates a dynamic attention user interface, the content filter module 230 can pre-fill in suggested fields and/or values based on historical prioritization selections made by the operator.

While an example manner of implementing the example operator station 115 of FIG. 1 has been illustrated in FIG. 2, the data structures, elements, processes and devices illustrated in FIG. 2 may be combined, divided, re-arranged, omitted, eliminated and/or implemented in any other way. Further, the example operating system 215, the example operator display module 220, the example user interface(s) 225, the example content filter module 230 and/or, more generally, the example operator station 115 of FIG. 2 may be implemented by hardware, software, firmware and/or any combination of hardware, software and/or firmware. Further still, the example operator station 115 may include additional elements, processes and/or devices instead of, or in addition to, those illustrated in FIG. 2, and/or may include more than one of any or all of the illustrated data structures, elements, processes and devices.

Figure 3:
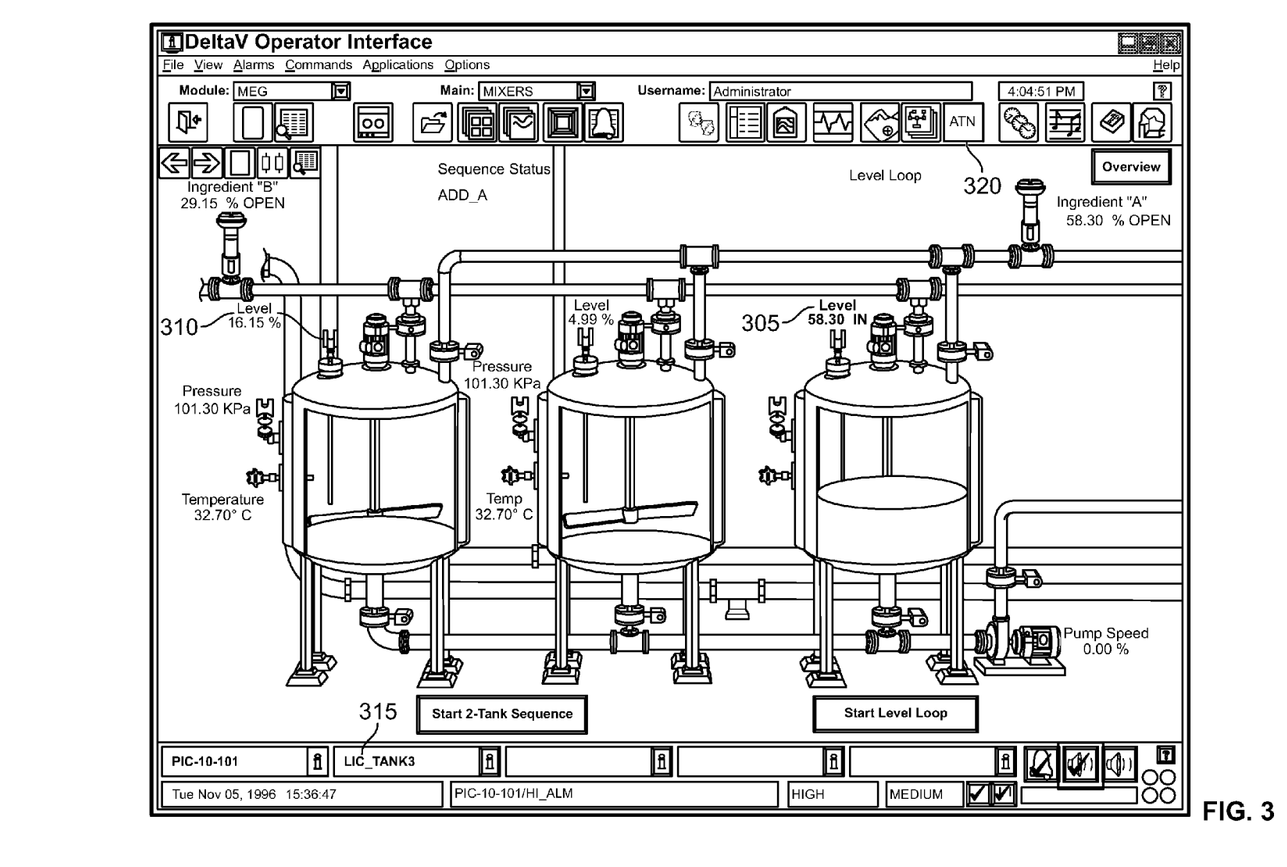
FIGS. 3, 4 and 5 illustrate example user interfaces that may be used to implement an operator display and/or application and/or, more generally, the example operator station of FIG. 1.
Figure 5:
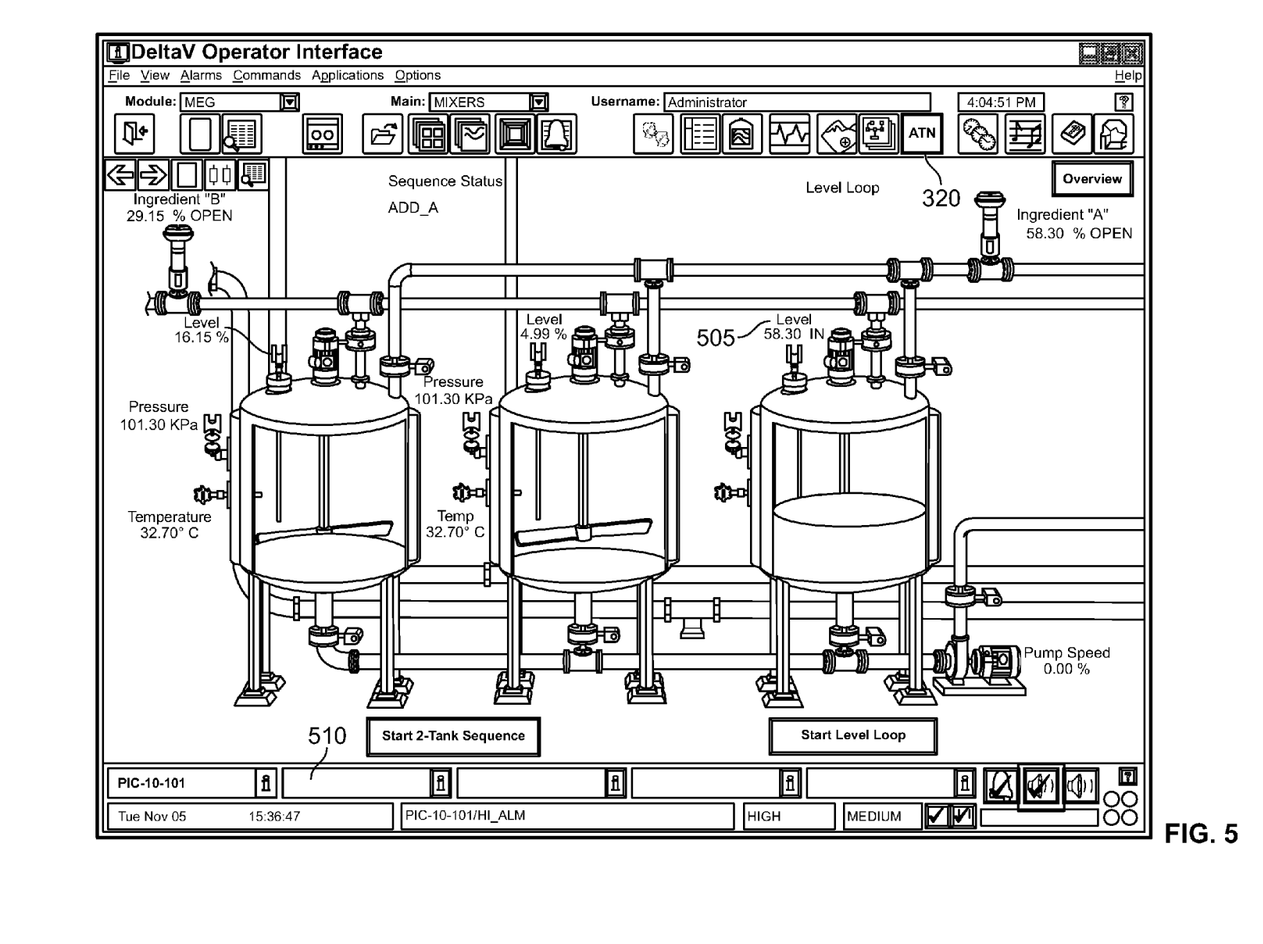

FIGS. 3 and 5 illustrate example user interfaces that may be used to implement an operator display and/or operator application, and/or, more generally, the example operator station 115 of FIG. 1. The example user interface of FIG. 5 is a second version of the example user interface of FIG. 3 after the example operator display module 220 of FIG. 2 has received instructions regarding the prioritization of displayed data and/or information from the example content filter module 230.

To display process data and/or information, the example user interface of FIG. 3 includes any number of display user interface elements, three of which are designated in FIG. 3 with reference numerals 305, 310 and 315. The example display element 305 displays the current level in the rightmost (LIC_TANK3) tank. Likewise, the example display element 310 displays the current level in the leftmost tank. The example display element 315 indicates that additional information regarding tank LIC_TANK3 is available for the operator.

To allow the operator to control the operator application, the example user interface of FIG. 3 includes one or more control user interface elements, one of which is designated at reference numeral 320 in FIG. 3. The example control element and/or graphic 320 of FIG. 3 allows an operator to enable and/or configure prioritization of data and/or information displayed in the example user interface of FIG. 3. When selected, the example control element 320 causes the operator display module 220 to display a dynamic attention user interface (e.g., the example interface of FIG. 4).

FIG. 4 illustrates an example dynamic attention user interface that may be used to implement the example operator station 115 of FIG. 1. The example dynamic attention user interface of FIG. 4 comprises one or more fields (one of which is designated at reference numeral 405 in FIG. 4) and one or more associated slider bars (one of which is designated at reference numeral 410). By entering a variable and/or keyword (e.g., "LIC_TANK3") in the example field 405 and adjusting the example slider bar 410, a user of the example dynamic attention user interface of FIG. 4 can adjust the priority of displaying information and/or data for LIC_TANK3 relative to other portions of the process plant. In the illustrated example of FIG. 4, the slider bar 410 is positioned in a leftmost position signifying that all information associated with LIC_TANK3 is to be suppressed (e.g., not displayed).

To indicate whether the prioritization of display information and/or data is applied to only the current operator display and/or application, or to other displays as well, the example dynamic attention user interface of FIG. 4 includes one or more check boxes, one of which is designated at reference numeral 415. When the example check box 415 is active (e.g., contains a √ or X), the prioritization slider associated with the check box 415 is only applied to the current operator display and/or application. If the example check box 415 is not checked (e.g., is blank and/or empty), the operator has the ability, from the dynamic attention user interface, to navigate to all other displays where this monitored item resides.

To indicate how long a prioritization is to be applied, the example dynamic attention user interface of FIG. 4 includes one or more text boxes, one of which is designated at reference numeral 420. When the example text box 420 is not blank, the contents of the text box 420 represent the amount of remaining time that the prioritization slider associated with the text box 420 is to be applied to the operator display(s). When the remaining time expires, the prioritization of the associated element is no longer applied. When the example text box 420 is blank, the prioritization slider associated with the text box 420 is to be indefinitely applied to the operator display(s)

The example user interface of FIG. 5 is a second version of the example user interface of FIG. 3 after the example content filter module 230 and/or the example operator display module 220 of FIG. 2 have applied the prioritization of process control data and/or information for LIC_TANK3. Compared to FIG. 3, a display user interface element 505 is grayed out indicating that the level of LIC_TANK3 has a reduced priority, and a display user interface element 510 is now blank. To indicate that display prioritization is active, the example control user interface element 320 of FIG. 3 is highlighted in FIG. 5.

Figure 6:
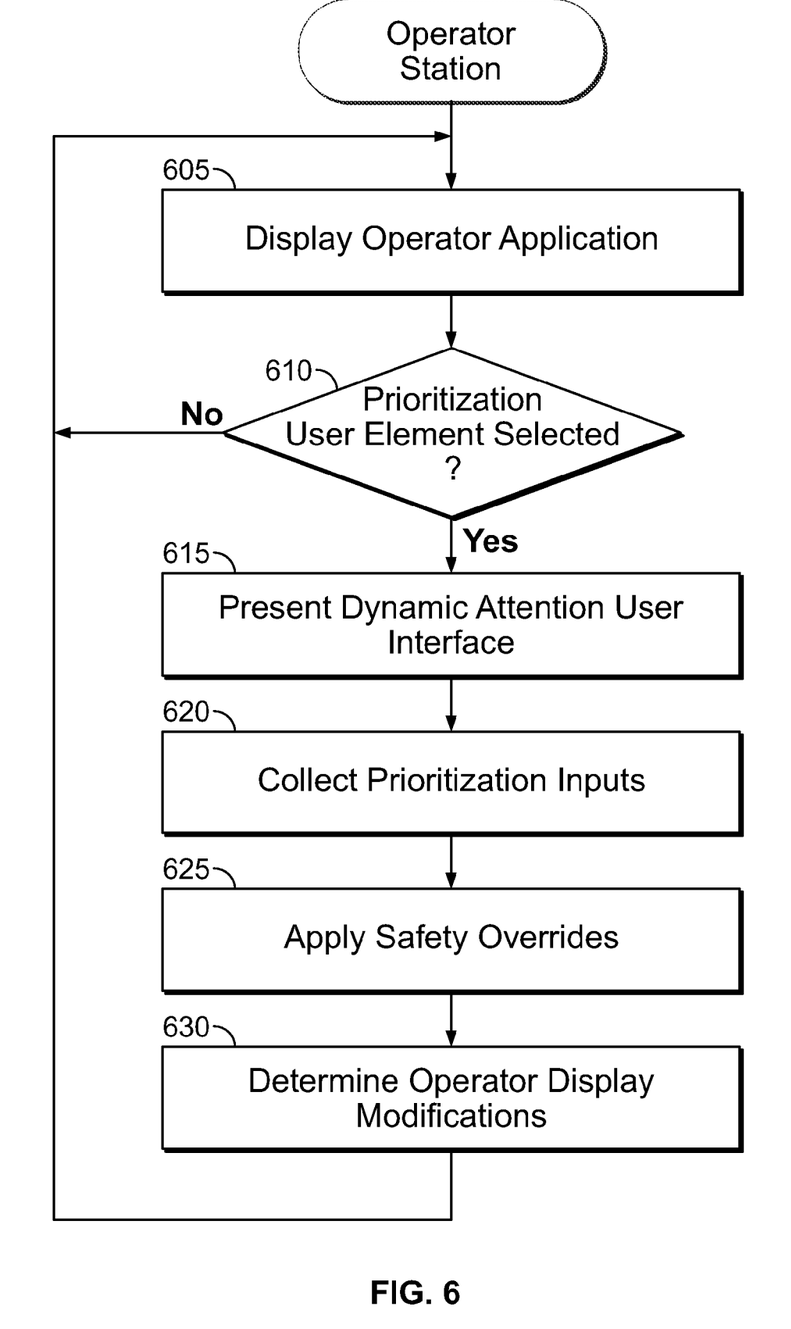
FIG. 6 is a flowchart representative of example process that may be carried out to implement the example operator station of FIG. 1.

FIG. 6 is a flowchart representative of an example process that may be carried out to the example operator station 115 of FIGS. 1 and/or 2. The example process of FIG. 6 may be carried out by a processor, a controller and/or any other suitable processing device. For example, the example process of FIG. 6 may be embodied in coded instructions stored on a tangible machine accessible or readable medium such as a flash memory, a ROM and/or random-access memory RAM associated with a processor (e.g., the example processor 705 discussed below in connection with FIG. 7). Alternatively, some or all of the example operations of FIG. 6 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations depicted in FIG. 6 may be implemented manually or as any combination of any of the foregoing techniques, for example, any combination of firmware, software, discrete logic and/or hardware. Further, although the example process of FIG. 6 is described with reference to the flowchart of FIG. 6, persons of ordinary skill in the art will readily appreciate that many other methods of implementing the example process of FIG. 6 may be employed. For example, the order of execution of the blocks may be changed, and/or some of the blocks described may be changed, eliminated, sub-divided, or combined. Additionally, persons of ordinary skill in the art will appreciate that any or all of the example operations of FIG. 6 may be carried out sequentially and/or carried out in parallel by, for example, separate processing threads, processors, devices, discrete logic, circuits, etc.

The example process of FIG. 6 begins with an operator station (e.g., the example operator display module 220) displaying a user interface (e.g., the example user interface of FIG. 3) (block 605). If a user (e.g., a process plant operator) selects a control user interface element and/or graphic (e.g., the example element 320) to provide data and/or information display prioritization (block 610), the operator display module presents a dynamic attention user interface (e.g., the example interface of FIG. 4) (block 615). When the user makes their prioritization inputs (block 620), the operator station (e.g., the example content filter module 230) applies any applicable safety overrides (block 625). The content filter module then determines which elements of the operator display need to be modified and notifies the operator display module of the changes (block 630). Control then returns to block 605 to display the updated operator display.

Figure 7:
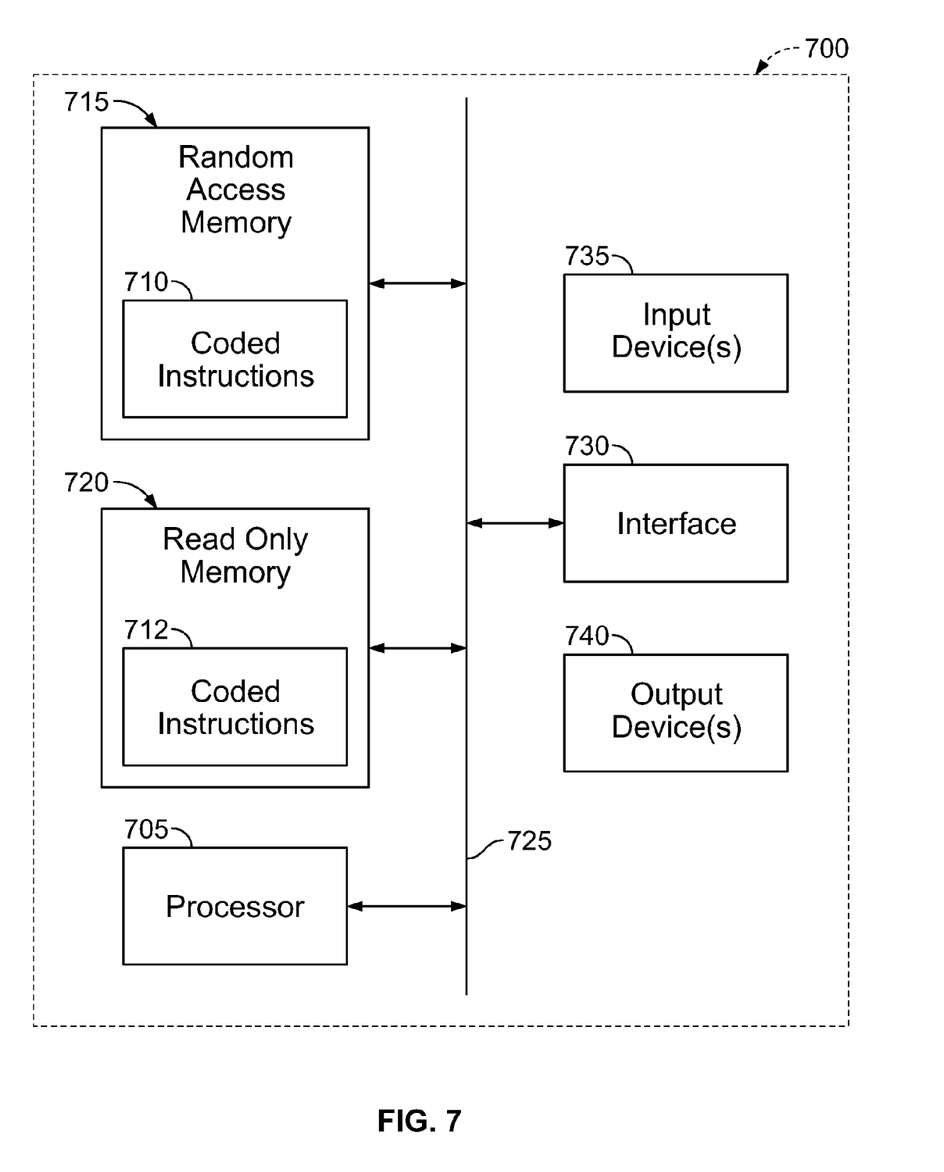
FIG. 7 is a schematic illustration of an example processor platform that may be used and/or programmed to carry out the example process of FIG. 6 and/or, more generally, to implement the example operator station of FIG. 1.

FIG. 7 is a schematic diagram of an example processor platform 700 that may be used and/or programmed to implement any or all of the example operator stations 115 of FIGS. 1 and/or 2. For example, the processor platform 700 can be implemented by one or more general purpose processors, processor cores, microcontrollers, etc.

The processor platform 700 of the example of FIG. 7 includes at least one general purpose programmable processor 705. The processor 705 executes coded instructions 710 and/or 712 present in main memory of the processor 705 (e.g., within a RAM 715 and/or a ROM 720). The processor 705 may be any type of processing unit, such as a processor core, a processor and/or a microcontroller. The processor 705 may execute, among other things, the example process of FIG. 6 to implement the example operator stations 115 described herein. The processor 705 is in communication with the main memory (including a ROM 720 and/or the RAM 715) via a bus 725. The RAM 715 may be implemented by DRAM, SDRAM, and/or any other type of RAM device, and ROM may be implemented by flash memory and/or any other desired type of memory device. Access to the memories 715 and 720 may be controlled by a memory controller (not shown).

The processor platform 700 also includes an interface circuit 730. The interface circuit 730 may be implemented by any type of interface standard, such as a USB interface, a Bluetooth interface, an external memory interface, serial port, general purpose input/output, etc. One or more input devices 735 and one or more output devices 740 are connected to the interface circuit 730. The input devices 735 and/or output devices 740 may be used to, for example, provide user interfaces 225 to the example display 235 of FIG. 2.

Although certain example methods, apparatus and articles of manufacture have been described herein, the scope of coverage of this patent is not limited thereto. Such example are intended to be non-limiting illustrative examples. On the contrary, this patent covers all methods, apparatus and articles of manufacture fairly falling within the scope of the appended claims either literally or under the doctrine of equivalents.

What is claimed is:

1. A method to control information presented to a process plant operator, the method comprising:
    presenting a process plant display including display elements;
    presenting a dynamic attention user interface when a user selectable element of the process plant display is activated by the process plant operator, wherein the dynamic attention user interface is to be used by the process plant operator to adjust a first importance level associated with a first one of the display elements, wherein the first importance level determines how the first display element is displayed relative to a second one of the display elements; and
    when the first importance level assigned to the first display element has less significance than a second importance level assigned to the second display element, modifying the process plant display to diminish an appearance of the first display element relative to an appearance of the second display element; and
    when the first importance level assigned to the first display element has more significance than the second importance level assigned the second display element, modifying the process plant display to highlight the appearance of the first display element relative to the appearance of the second display element.

2. A method as defined in claim 1, wherein the first display element is associated with a piece of equipment of a process plant.

3. A method as defined in claim 1, further comprising highlighting an appearance of the user selectable element to indicate that the information presented in the process plant display was adjusted.

4. A method as defined in claim 1, further comprising removing the first display element from the process plant display when the first importance level indicates that the process plant operator wants to ignore the first display element.

5. A method as defined in claim 1, further comprising presenting the dynamic attention user interface when the first display element of the process plant display is selected.

6. A method as defined in claim 1, wherein the process plant display is defined by a process plant configuration engineer, and wherein the dynamic attention user interface allows the process plant operator to adjust how information is presented in the process plant display.

7. A method as defined in claim 1, wherein the dynamic attention user interface comprises:
    a text entry field to identify the first display element; and
    a slider bar to adjust the first importance level associated with the first display element.

8. A method as defined in claim 7, wherein the dynamic attention user interface further comprises a second text entry field to identify a time duration associated with the adjustment of the the first importance level of the first display element.

9. A method as defined in claim 1, further comprising using the first importance level to adjust the dynamic attention user interface when the dynamic attention user interface is presented a second time.

10. A method as defined in claim 1, further comprising pre-filling a text entry field with an identity of the first display element.

11. A method as defined in claim 1, further comprising storing the first importance level in at least one of an electronic operator log, a system event log, a dynamic attention log, or a dynamic attention database.

12. A method as defined in claim 1, wherein the first display element is associated with at least one of a process plant entity, a process plant state, a process plant variable, a process plant set-point, configuration data, an alarm, a status, a status change, a flag, a flag change, a process plant variable change, a process plant state change, an alarm priority, an alarm type, a duration, a new item, or a new variable.

13. An operator station apparatus comprising:
    a display;
    an operator display module to present an operator application on the display;
    a dynamic attention user interface to be presented on the display including a user adjustable input element to enable a process plant operator to select a first importance level of a first display element, wherein the first importance level forms a basis for setting a content filter rule; and
    a content filter module to adjust an appearance of how the first display element is presented by the operator application based on the content filter rule by:
        when the first display element has a lower importance level than a second importance level of a second display element, modifying the operator application to diminish an appearance of the first display element relative to an appearance of the second display element; and
        when the first display element has a higher importance level than the second importance level of the second display element, modifying the operator application to highlight an appearance of the first display element relative to the second display element.

14. An apparatus as defined in claim 13, wherein the dynamic attention user interface is to be activated when a user selectable element of the operator application is activated by the process plant operator.

15. An apparatus as defined in claim 13, wherein the operator station apparatus comprises an operator station of a process plant control system.

16. An apparatus as defined in claim 13, wherein the content filter module is to remove the first display element from the operator application when the first importance level indicates that the first display element is to be ignored.

17. An apparatus as defined in claim 13, wherein the operator application is defined by a process plant configuration engineer, and wherein the dynamic attention user interface allows the process plant operator to adjust how information is presented by the operator application.

18. An apparatus as defined in claim 13, further comprising a dynamic attention database to store at least one of the content filter rule, an operator identifier, a past content filter rule, a preference, or an area of responsibility.

19. A tangible article of manufacture storing machine readable instructions that, when executed, cause a machine to control information presented to a process plant operator by at least:

presenting a process plant display including display elements;

presenting a dynamic attention user interface when a user selectable element of the process plant display is activated by the process plant operator, wherein the dynamic attention user interface is to be used by the process plant operator to adjust a first importance level associated with a first one of the display elements, wherein the first importance level determines how the first display element is displayed relative to a second one of the display elements; and when the first importance level assigned to the first display element has less significance than a second importance level assigned to the second display element, modifying the process plant display to diminish an appearance of the first display element relative to an appearance of the second display element; and when the first importance level assigned to the first display element has more significance than the second importance level assigned to the second display element, modifying the process plant display to highlight the appearance of the first display element relative to the appearance of the second display element.

20. An article of manufacture as defined in claim 19, wherein the machine readable instructions, when executed, cause the machine to remove the first display element from the process plant display when the first importance level indicates that the first display element is to be ignored.

21. An article of manufacture as defined in claim 19, wherein the machine readable instructions, when executed, cause the machine to present the dynamic attention user interface when the first display element is selected.

22. An article of manufacture as defined in claim 19, wherein the machine readable instructions, when executed, cause the machine to use the first importance level to adjust the dynamic attention user interface when the dynamic attention user interface is presented a second time.

* * * * *

UNITED STATES PATENT AND TRADEMARK OFFICE
CERTIFICATE OF CORRECTION

PATENT NO. : 8,392,845 B2
APPLICATION NO. : 11/849796
DATED : March 5, 2013
INVENTOR(S) : Cahill et al.

Page 1 of 1

It is certified that error appears in the above-identified patent and that said Letters Patent is hereby corrected as shown below:

In the Claims

Column 12, line 4 (claim 8), delete "the" before "first importance level"

Signed and Sealed this
Ninth Day of July, 2013

Teresa Stanek Rea
*Acting Director of the United States Patent and Trademark Office*